United States Patent
Doi

(10) Patent No.: US 10,263,767 B1
(45) Date of Patent: Apr. 16, 2019

(54) SYSTEM AND METHOD FOR POWER ANALYSIS RESISTANT CLOCK

(71) Applicant: Rajant Corporation, Wayne, PA (US)

(72) Inventor: Bryan Doi, Chandler Heights, AZ (US)

(73) Assignee: RAJANT CORPORATION, Wayne, PA (US)

( * ) Notice: Subject to any disclaimer, the term of this patent is extended or adjusted under 35 U.S.C. 154(b) by 0 days.

(21) Appl. No.: 16/026,751

(22) Filed: Jul. 3, 2018

(51) Int. Cl.
*H04L 9/00* (2006.01)
*G06F 7/58* (2006.01)
*G06F 21/75* (2013.01)
*G06F 21/72* (2013.01)

(52) U.S. Cl.
CPC ............... *H04L 9/003* (2013.01); *G06F 7/582* (2013.01); *G06F 21/72* (2013.01); *G06F 21/755* (2017.08); *H04L 2209/08* (2013.01); *H04L 2209/12* (2013.01)

(58) Field of Classification Search
CPC . H04L 9/003; H04L 2209/08; H04L 2209/12; G06F 21/72; G06F 21/755; G06F 7/582
USPC .......................................................... 326/8
See application file for complete search history.

(56) References Cited

U.S. PATENT DOCUMENTS

| | | | | |
|---|---|---|---|---|
| 8,131,789 | B2 * | 3/2012 | Vergnes | H04L 9/0861 708/251 |
| 8,427,194 | B2 | 4/2013 | Deas et al. | |
| 8,781,111 | B2 | 7/2014 | Qi et al. | |
| 9,331,848 | B1 * | 5/2016 | Pedersen | H04L 9/003 |
| 9,401,802 | B2 | 7/2016 | Card | |
| 2008/0143561 | A1 * | 6/2008 | Miyato | H03M 5/04 341/79 |
| 2009/0327382 | A1 * | 12/2009 | Hisakado | G06F 7/582 708/252 |
| 2011/0260749 | A1 | 10/2011 | Deas et al. | |
| 2017/0244546 | A1 | 8/2017 | Stark | |
| 2017/0262630 | A1 | 9/2017 | Teper et al. | |

OTHER PUBLICATIONS

Bayrak, A., et al., "An EDA-Friendly Protection Scheme against Side-Channel Attacks", School of Computer and Communication Sciences, 2013, pp. 1-6.

* cited by examiner

*Primary Examiner* — Daniel D Chang
(74) *Attorney, Agent, or Firm* — Drinker Biddle & Reath LLP

(57) ABSTRACT

A system and method to mitigate or complicate the use of differential power analysis (DPA) and simple power analysis (SPA) in the attack of a targeted integrated circuit, or device containing an integrated circuit, that is processing sensitive information. The system and method modifies the regularity of a clock that initiates the power events within the circuit such that subsequent processing of information does not always occur at the same time.

12 Claims, 12 Drawing Sheets

SYSTEM AND METHOD FOR POWER ANALYSIS RESISTANT CLOCK

TECHNICAL FIELD AND BACKGROUND

The present disclosure relates generally to the field of security and more specifically to a system and method to secure technological devices from side-channel attacks.

SUMMARY

There is provided, in accordance with some embodiments of the present disclosure, an apparatus that includes logic elements configured to mitigate or complicate the use of differential power analysis (DPA) and simple power analysis (SPA) in the attack of a targeted circuit, or device containing a circuit, that is processing information. The apparatus is configured to modify the regularity of a clock that initiates the power events within the circuit such that subsequent processing of information does not always occur at the same time.

In at least some embodiments, an apparatus resistant to power analysis includes a control logic circuit configured to distribute a system clock signal; a linear feedback shift register configured to output a pseudo-random bit stream; a first decoder configured to receive the pseudo-random bit stream and to output a selector signal; a counter configured to output a linear feedback shift register clock pattern; a second decoder configured to receive the linear feedback shift register clock pattern, detect when the linear feedback shift register will repeat, and to output a signal to the control logic circuit; and a multiplexer configured to receive the selector signal and the linear feedback shift register clock pattern and to output a pseudo-random clock signal, wherein the pseudo-random clock signal is used to clock a circuit that processes data.

Some embodiments may further include: the counter having one or more flip-flops configured to achieve a maximal length; the control logic further configured to receive a reset signal and/or an error signal, to safeguard the counter against a lockup state; and/or the control logic further configured to ensure that a starting sequence is varied following a reset or power-on event.

There is further provided, in accordance with some embodiments of the present disclosure, a method that mitigates or complicates the use of differential power analysis DPA and simple power analysis SPA in the attack of a targeted circuit, or device containing a circuit, that is processing information. The method modifies the regularity of a clock that initiates the power events within the circuit such that subsequent processing of information does not always occur at the same time.

In at least some embodiments, a method for generating a power analysis-resistant clock signal includes outputting, by a first linear feedback shift register, a first value; receiving the first value, by a first decoder, and outputting a first active signal; outputting, by a second linear feedback shift register, a second value; receiving, by a multiplexer, the first active signal and the second value, and outputting a clockout, wherein the multiplexer uses the first active signal to select the clockout from the second value; distributing, by a control logic circuit, a system clock signal to the first linear feedback shift register and the second linear feedback shift register; further wherein the second value is also received by a second decoder that outputs a second signal that is received by the control logic circuit to increment the first linear feedback shift register until the first linear feedback shift register wraps around.

Some embodiments may further include: an error signal that identifies if a linear feedback shift register enters an illegal state; stopping, re-initializing, or restarting, by the control logic circuit, using a preset signal; or having, for a linear feedback shift register, a fixed value initialized or a value initialized based on a value loaded from a prior saved value or from a randomly generated value.

DRAWINGS

The accompanying figures, which are incorporated herein and form a part of the specification, illustrate various exemplary embodiments of the disclosure and, together with the description, further serve to explain various principles and to enable a person skilled in the pertinent art to make and use the disclosure.

Figure 11A:
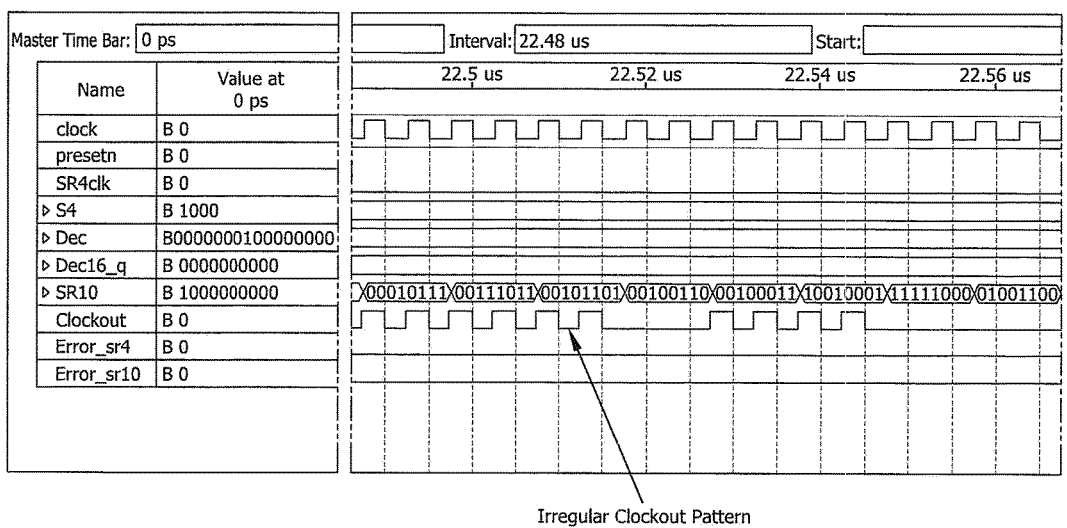
Figure 11B:
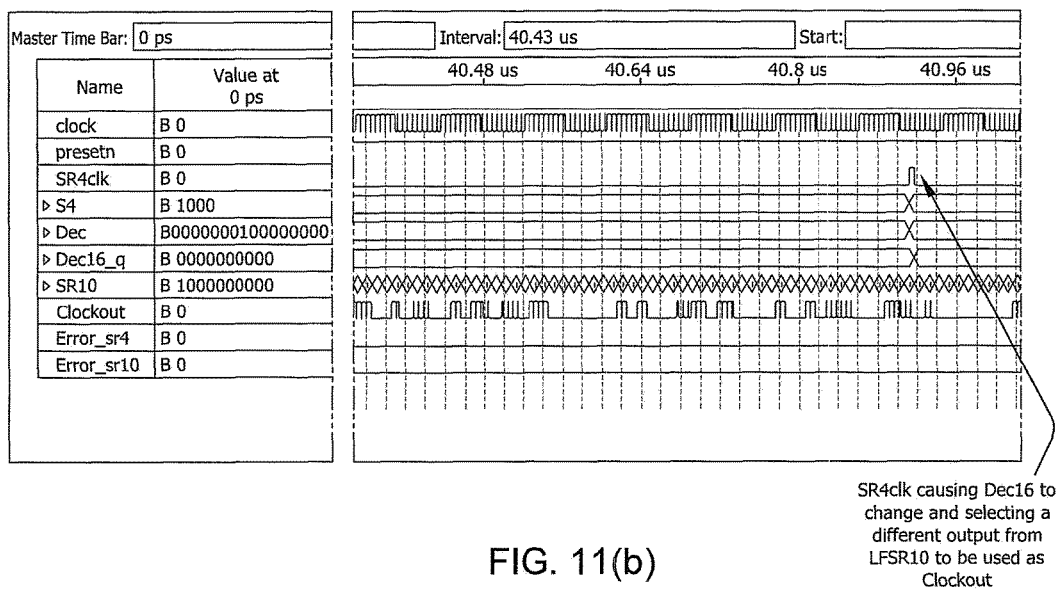

FIG. 11(a) and FIG. 11(b) illustrate simulated waveforms according to exemplary embodiments of the present disclosure.

DESCRIPTION

Security is important in modern devices. A weakness is fragility against cryptographic attacks, such as side-channel attacks that exploit information leaked by a device, including power consumption, timing, electromagnetic radiation or acoustic emission, allowing the attacker to recover secret information regarding data processed and instructions executed. In some cases, if the attacker has access to the device and iteratively varies the inputs, information regarding the private key or other information may be determined.

Differential power analysis (DPA) and simple power analysis (SPA) are side-channel attacks that are typically a non-intrusive method used to attack systems with the goal of extracting information that is meant to be kept confidential or secret. The attack measures the variations in power utilized by the circuit as it performs different operations. In digital circuits, power is mostly consumed at clock edges, which repeat in a fixed frequency and allows power to be measured at the clock edges.

The advent of more sophisticated attacks, such as DPA or SPA, are being used to attempt to extract critical information, such as encryption keys. The goal of the attacker, for example, is to obtain the keys and thereby obtain the encrypted data/information that the keys are protecting. Such information may be intellectual property, financial information, or other sensitive information, for example.

Countermeasures have been developed to defeat or thwart DPA and SPA attacks. For example, generating random noise to attempt to mask sensitive data processing. This method generates random noise in the circuit to make collection of power signature information more difficult. The attempt to hide or mask the information is often referred to as "obfuscation." The use of repetitive sampling and averaging, however, can be used by attackers to filter the ransom noise thus negating the masking attempt.

Another countermeasure example is generating complimentary logic to switch the data and power for each operation. This method uses an identical circuit operating at the exact same time as the sensitive circuit to create complimentary power noise in an attempt to mask the power signature of the processing taking place. This, however, can add significant additional circuitry (e.g., chip space) and power dissipation to the sensitive circuit. Moreover, averaging the power over repeated operations can still convey information and a complete power complementary circuit is difficult to implement due to physical placement differences, logic availability, and design tool limitations.

Another countermeasure example is breaking up the sensitive operation using multiple keys in an attempt to make the sampling of information shorter than the ability to gather enough samples to execute power analysis. However, as attack technology (e.g., DPA/SPA) become more sophisticated, the number of samples required to gather sufficient information is far reduced, thus negating advantages that breaking up the operation using multiple keys provides.

Embodiments of this disclosure complicate the ability to sample power signatures on multiple rounds because the same algorithm and key are not in the same position in time from operation to operation. This makes collection and analysis extremely difficult. Certain embodiments of the disclosure are further scalable within the design by extending the period of repetition as well as the restart randomness, which also makes power data collection far more difficult.

Specifically, certain embodiments of the disclosure utilize a linear feedback shift register (LFSR) counter to generate a stream of clock outputs from each register in the counter. Each register in that counter is selected such that at the point where the LFSR counter repeats, a new output register is selected to be the output clock bit stream. The design can be extended if the implementation of the LFSR pattern (N-bit) counter is also modified in length during the operation to make the count lengths more difficult to predict.

Unlike other techniques, embodiments of the disclosure do not rely on adding uncertainty to the clock frequency of the circuit running the protected operation. Embodiments of the present disclosure thus do not use random numbers to adjust the clock edge or rely on analog delays (e.g., delay lines) or voltage controlled oscillators (VCO), which are not part of a standard application specific integrated circuit (ASIC) or field programmable gate array (FPGA) library. Indeed, embodiments of the disclosure randomize clock edges while maintaining the average clock frequency.

This specification describes embodiments that are described in terms of one or more examples, with reference to the accompanying figures. In the figures, like reference numbers indicate identical or functionally similar elements. Those skilled in the art will appreciate various approaches and features that may be used individually or in combination with each other as desired.

Embodiments of the disclosure may be implemented in hardware, firmware, software, or any combination thereof for performing certain actions as described herein. For example, ASICs may be fabricated to implement some or all of the processing steps described as well as more generic programmable logic options such as FPGAs and DSPs. It should be appreciated that the descriptions are merely for convenience and that the actions in fact result from computing devices, processors, controllers, or other hard-wired devices or devices executing the firmware, software, routines, instructions, etc. It is expected that one of ordinary skill, when guided by the concepts and principles disclosed herein will be readily capable of generating such software instructions, programs, circuits and devices with minimal experimentation.

The detailed designs described below are just examples of certain embodiments of the disclosure, which is not limited to the specific embodiments disclosed, in whole or in, part, but instead incorporates the full scope of the patent claims. Thus, the following detailed descriptions are exemplary in nature and not intended to limit the invention or the application and uses of the invention.

Figure 1:
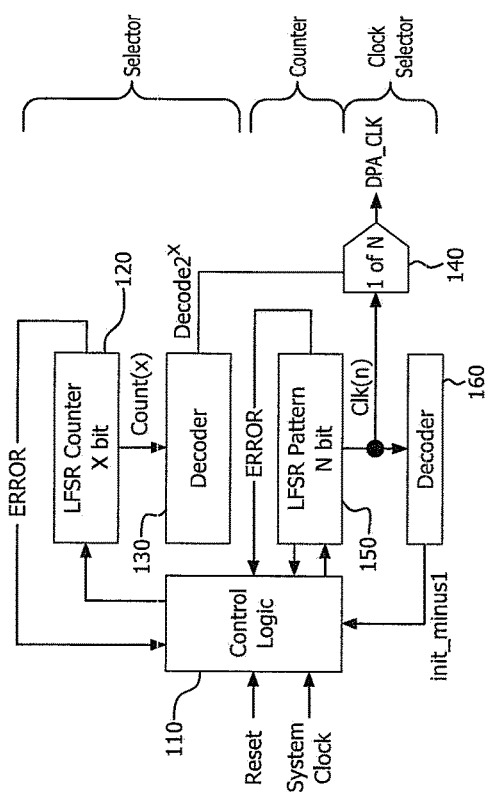
FIG. 1 is a block diagram of a power analysis resistant clock according to at least one embodiment of the present disclosure.

FIG. 1 illustrates a high-level block diagram of certain embodiments of the present disclosure. A linear feedback shift register (LFSR) counter creates a pseudo-random bit stream at the outputs of the counter. The LFSR counter is chosen for a particular length(n), which determines the number of clock events that have to occur before the counter values repeat. A LFSR counter is able to create varying length counts before repeating and is made using feedback terms for the individual bits of the counter. In at least some embodiments a maximal length counter is preferred. The maximal length counter is achieved by selecting individual bit feedback terms in the counter to create the largest number of counts before the counter repeats. If the correct feedback terms are chosen for the binary count, the maximal count of the shift register is $(2^n-1)$.

Figure 6:
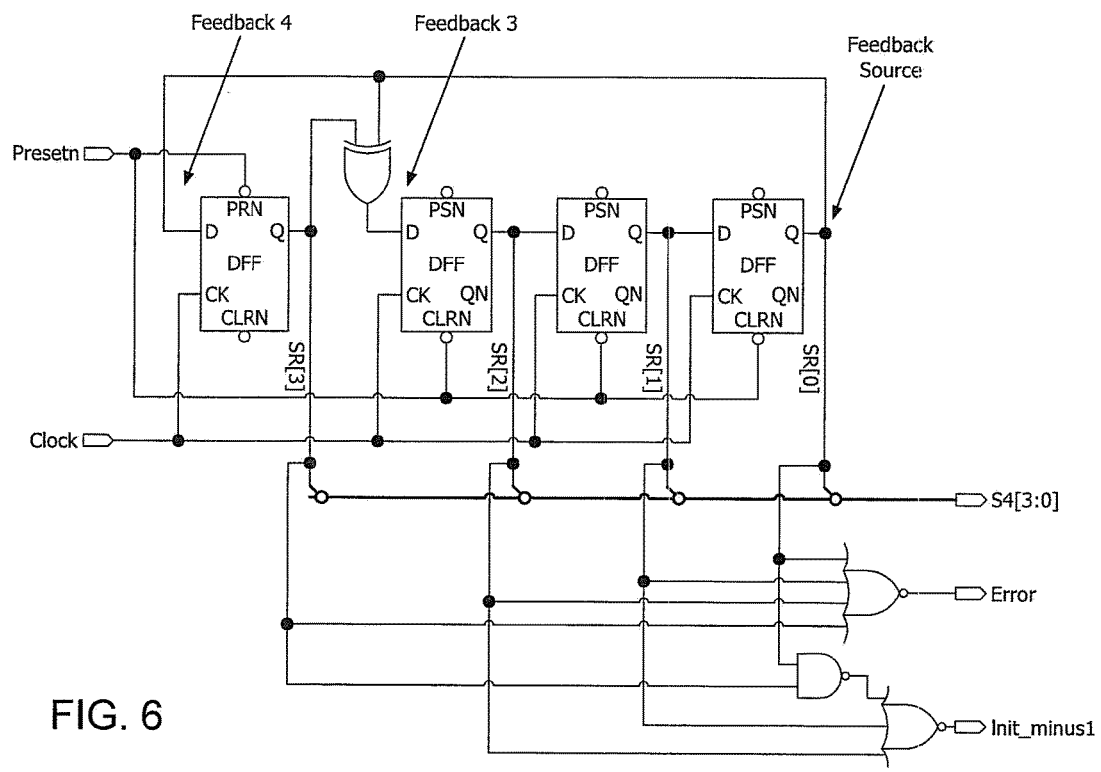
FIG. 6 is a schematic of an exemplary linear feedback shift register counter.

For example, in FIG. 6, the LFSR counter is composed of four flip-flops in a shift register configuration. The feedback terms to create a maximal length count are 4 and 3. As can be seen in the figure, the fourth bit (farthest to the left) and the third bit (the bit next to it on the right) have their inputs coming in part from the bit farthest on the right, bit 1, which is the feedback source. Numerous published articles provide tables that define the feedback terms for maximal length counts.

The selection of the correct feedback terms within the LFSR yields a maximal length counter. The maximal count provides that each output of the counter's n stages has, over time, an equivalent number of 1's and 0's and, by using a selector, each bit of the counter can be selected in sequence to create a $(2^n-1)*n$ length of clocks before the pattern repeats. The selector sequence is generated, for example, by a second LFSR or other means such that the selector sequence is not an easily predicted sequence.

Referring further to FIG. 1, the Control Logic block 110 functions to control the external Reset signal, distribute the System Clock, and react to any error signals from the blocks 120 and 150.

The LFSR Counter X bit 120 functions as an LFSR counter with the direct count output Count(X) used as input to a Decoder 130. The combination of the LFSR Counter X bit 120 and Decoder 130 is to act as a "Selector" into an output multiplexor "1 of N" 140. The "1 of N" multiplexor 140 selects which output of the LFSR Pattern N bit counter 150 will be used to generate the DPA_CLK output. The combination of the LFSR Counter X bit 120, Count(x) Decoder 130 and "1 of N" multiplexor 140 make up the randomized selection process described below in the 3-bit LFSR example.

LFSR Pattern N bit counter 150 functions to create the LFSR clock patterns and is analogous in functional partition to the 3-bit LFSR counter in the below example. The Clk(n) bits are the Q1, Q2, . . . outputs. The ERROR lines are checking to ensure the LFSR patterns do not use any illegal patterns or lockup states due to a circuit malfunction or disruptive event occurring. Lockup means that the counter will be stuck with the outputs being all zero and will not advance in count with each successive clock. The illegal pattern for most counters is all zeroes. Thus, upon detection of an all zero lockup state resets the LFSR counter to a known good starting point.

The decoder 160 in FIG. 1 checks the outputs of the LFSR Pattern N bit counter 150 and detects when the LFSR Pattern N bit counter 150 is near the point where the clocking pattern will repeat or roll-over. The decoder 160 decodes the output a couple of counts before the LFSR Pattern N bit counter 150 repeats. The decode of the output before the LFSR Pattern N bit counter 150 repeats allows the control logic 110 to react and enable the LFSR Counter X bit 120 to advance to the next count and thereby through the Decoder 160 and 1 of N 140 select the next output of the LFSR Pattern N bit 150.

Thus, embodiments of the present disclosure create a pseudo-random series of clock pulses at the DPA_CLK output, which clocks a circuit that manipulates or processes important information. A counter of sufficient length will make the sequence longer than the actual processing time of the sensitive circuit. In certain embodiments, it is important that the starting sequence following a reset or power-on event is not the same for each reset or power-on event. By changing the starting point on each reset or power-on, this makes the power signature of the sensitive circuit differ on each restart or power-on and is accomplished by storing the selector count between each reset or power-on event such that it does not always start from the same point, for example.

In more detail, and referring still to FIG. 1 generally, the operation starts with an input of a System Clock and Reset signal. The Reset signal initializes the circuit for operation. The control logic 110 takes the inputs System Clock and Reset and generates the required Clock and Presetn as shown in FIG. 6, the Presetn signal sets the far left (fourth) flip-flop to a 1 by driving the pseudo-random number (PRN) input low, it also sets flip-flops 3, 2, and 1 to 0 by driving the CLRN input low. The result being that the LFSR counter starts in a known condition and, in this case, 1000 is the flip-flop contents from left to right. In some embodiments, the Presetn signal only affects portions of the circuit. By only setting a few of the flip-flops in the maximal count configured LFSR counters to a known value the power up state of the counter can be randomized, at least to some extent, while still avoiding the lockup state of the counter. In this example, the counters are initialized by external control logic during the power-on setup phase of operation or via configuration for clarity. As noted, the ability to save the state and recover on a power cycle or reset cycle or a partial randomization of the LFSR counter startup values is preferred in some embodiments so the circuit will not repeat the same clock sequence on each restart.

Figure 2:
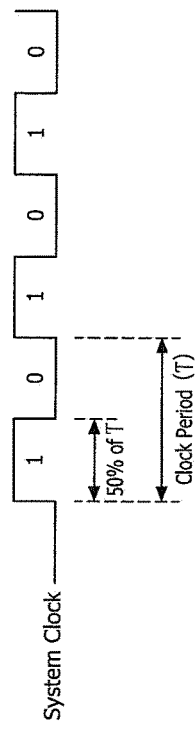
FIG. 2 illustrates a typical digital system clock cycle.

To elaborate further on the teachings of embodiments of the present disclosure, FIG. 2 illustrates a typical digital system clock cycle of alternating 1's and 0's. Logic operations or calculations typically start on one edge of the system clock and complete before the next edge of the system clock in synchronous design (i.e., all operations are synchronized to a clock edge). Such a method is typical for digital ASIC or FPGA designs, and the tools that are built to support the design and verification of the circuits is built around the concept of synchronous design.

Side-channel attacks using power analysis takes advantage of this synchronous behavior as peak power usage occurs relative to the clock edges. As such, capturing the power usage over time and averaging (filtering) the background random noise allows the would-be attacker to see how much power is being used by the circuit at a given time. By controlling the input data and repeating the operations under attack, the power signature of the operations is obtained. Given the knowledge of the operation being performed and the data that is input into the system, the attack is able to "guess" at the part of the data that is of interest. That data is typically a key used to either encrypt or decrypt the data.

Embodiments of the disclosure make this gleaning of sensitive data more difficult to obtain. It is assumed the attacker can control the data and has the ability to repeat the operation in sufficient numbers to allow him to collect enough samples to attempt to filter the power signatures. Therefore, embodiments of the disclosure randomize the time during which the operation will occur from one collection cycle to the next. The averaging of the power signatures becomes more difficult as the same event from collection cycle to collection cycle will not be in the same place in time. Embodiments of the disclosure include a circuit to generate a clock where the 1's and 0's are irregular and not repeated yet utilize standard digital ASIC and FPGA library elements and a design that will work with standard digital development tools and verification flows.

There are several ways to modify the clock and skew edges using delay lines or VCOs to move the clock edges. These techniques, however, do not rely on available design library and development/verification tools to design the circuit, but instead rely on custom circuits or custom verification methodologies that complicate design and manufacturing, for example.

Embodiments of the present disclosure utilize a random digital number that is generated from a linear feedback shift register, also known as an LFSR. The LFSR is a counter that does not count in a linear fashion, meaning it does not start at 1 and count up to the final value and start back over at 1 again. The LFSR "counts" through all of its defined states and returns to its starting state. As such, the LFSR is technically a pseudo-random number generator (PRNG) since it has a defined starting point and sequence whereas a true random number generator (TRNG) does not have a defined starting point or defined sequence of numbers. For at least some embodiments of this disclosure, a PRNG is preferred.

Figure 3:
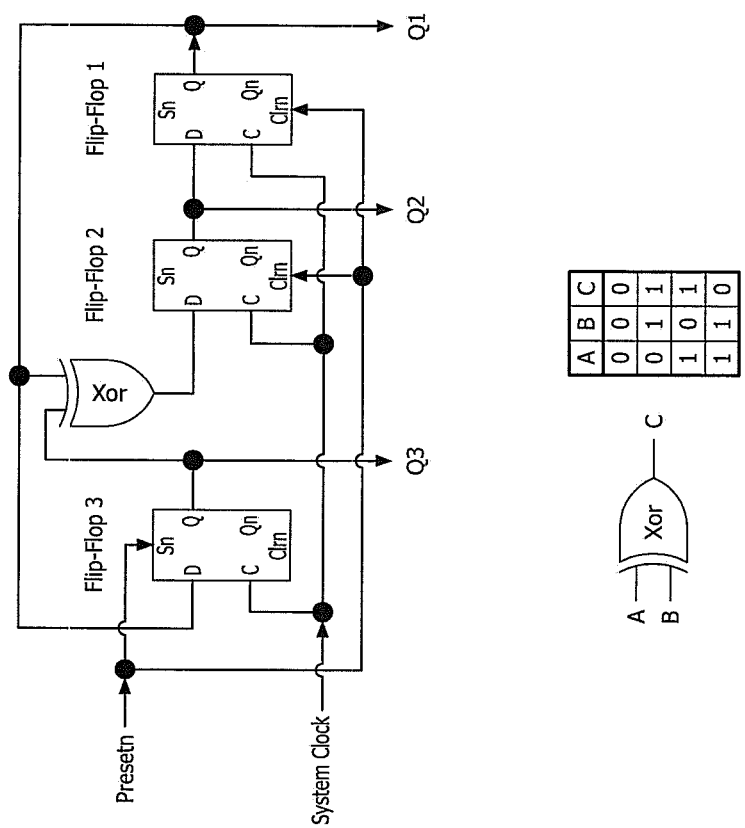
FIG. 3 is a schematic of an exemplary 3-bit linear feedback shift register.

By way of example, a 3-bit LFSR generates seven states (the eighth state of all 0's is an error state that does not allow the LFSR to count) and is illustrated in FIG. 3. The 3-bit LFSR operates off a 50% duty cycle System Clock with outputs Q3, Q2, and Q1. The Presetn signal initializes the counter to a value of 100 (Q3, Q2, Q1). In this example, the LFSR starts with a value 100 and counts on each rising edge of the system clock. The count sequence is:

| Count | Decimal | Q3 | Q2 | Q1 | |
|---|---|---|---|---|---|
| 1 | 4 | 1 | 0 | 0 | start |
| 2 | 2 | 0 | 1 | 0 | |
| 3 | 1 | 0 | 0 | 1 | |
| 4 | 6 | 1 | 1 | 0 | |
| 5 | 3 | 0 | 1 | 1 | |
| 6 | 7 | 1 | 1 | 1 | |
| 7 | 5 | 1 | 0 | 1 | |
| 8 | 4 | 1 | 0 | 0 | repeats |

Figure 4:
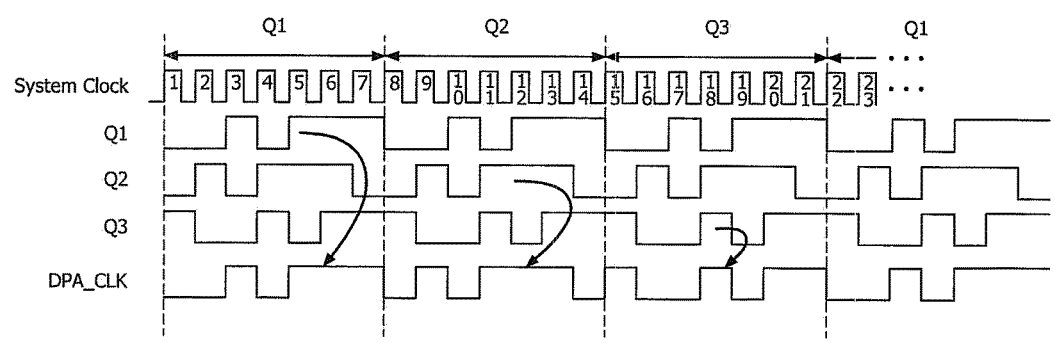
FIG. 4 is a digital timing diagram of the exemplary 3-bit linear feedback shift register.

As shown in the table, each count progresses to a new value in the outputs for Q3, Q2, and Q1. The decimal equivalent of the values of outputs is shown under the decimal column. The numbers are not a linear count starting at 1 and progressing to 7 but a "random" series of numbers which repeats at count 8. At least some embodiments of the present disclosure use the values of Q3, Q2, and Q1 to create a series of 1's and 0's patterns by taking each output in series concatenating the next output. For example, starting at Q1, count 1 the Q1 output is 0, then at count 2 the Q1 output is 0, and count 3 the Q1 output is 1, count 4 the output is 0 and count 5 the output is 1, count 6 the output is 1 and finally count 7 the output is 1. Next, Q2 is selected at count 8, which is equivalent to count 1 which has a value of 0 and so on until we complete all counts up to count 7 on output Q3 as shown in FIG. 4. Thus, the output in the example is 001011101011101001011. It is to be noted that the minimum clock period of the Q1-Q3 outputs is ½ the System Clock frequency (2× the period). This is a normal effect of using a flip-flop as a storage mechanism in the LFSR implementation.

While a 3-bit LFSR is a short counter series, a much longer series is envisioned for practical applications. The length of the count is therefore increased to extend the number of counts before the pattern will repeat. Indeed, it is preferable to extend the count much longer than a particular operation will take to complete so the count will not repeat during the operation and will not begin in the same starting count position on the next operation.

Further extension is achieved by changing the order in which the Q outputs are selected. The example above uses a Q1 then Q2 then Q3 selection, however, there is no requirement to make this order specific, but rather a randomized selection of the Q value used to output to DPA_CLK will extend the length of the counts before repetition as well as optimize the length of the LFSR required. In other words, by changing the selection of Q1 to then follow by Q3 then follow by Q1 and then Q2, Q1, Q3, etc., the value of random sequence of clocks can be extended further than shown above. This is shown in FIG. 1 and described above.

Figure 5:
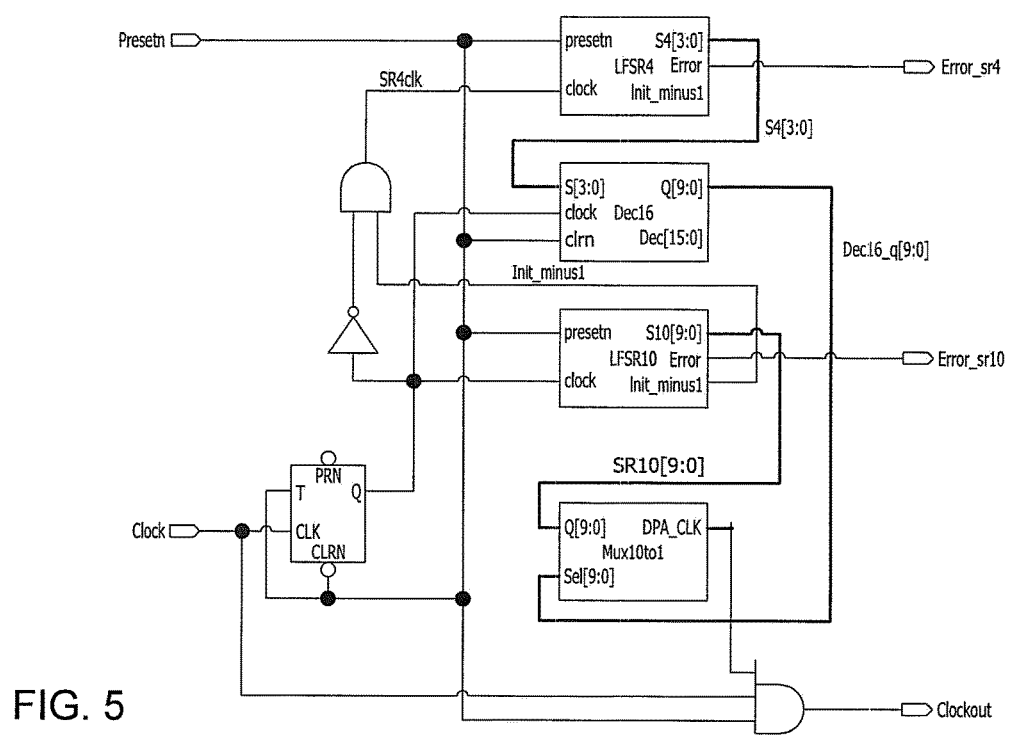
FIG. 5 is a schematic of an exemplary differential power analysis counter.

FIG. 5 provides lower level detail of the previously discussed high-level block diagram and shows logically how the Clock and Presetn (or reset) is distributed. A notional 4-bit LFSR (LFSR4) generates the random output clock selection signals through the decoder (Dec16). The Dec16 output controls which output from the 10 bit LFSR (LFSR10) is selected to be output as the Clockout (DPA_CLK). The error signals (Error_sr4 and Error_sr10) exit the block for use by an external controller (not shown). The details of the LFSR4 are described further below. It is notable that in certain embodiments, the Clockout is not directly the DPA_CLK but rather is synchronized with the Clock to control the Clockout synchronization and pulse width.

For simplicity an "AND" 501 gate is shown, but in at least certain embodiments a different solution is used to provide a clean Clockout. Thus, the presence of an "AND" 501 gate between the output of the Mux10to1 (DPA_CLK) and the Clockout is a notional illustration, like many aspects of the illustrative embodiments disclosed herein. For example, synchronous circuits that may utilize the Clockout require a glitch-free clock. And the timing diagrams herein show idealized clocking. In actual applications, however, there are signal delays generated from the clocks that may skew the resulting signals. As such, the actual circuit used to generate a glitch-free Clockout signal is dependent on the application, technology, and libraries used in the final design.

In more detail and referring still to FIG. 5, once the circuit is enabled by setting Presetn to a high logic state (release reset), the LFSR4 counter awaits the arrival of a clock (SR4clk), LFSR4 clock is initiated by the LFSR10 block and, in some embodiments, uses the clock rollover minus 1 (init_minus1) to clock the LFSR4 counter at the same time as the LFSR10 counter is rolling over. The Dec16 block generates ten output signals, Dec16_q(9:0) even though it has a total of fifteen decodes. Some of the 16 decodes are "OR'd" with other counts to "compress" the 16 decodes into the 10 outputs. By choosing the correct signals to "OR," the "OR'd" values to switch over when both are at a logic low value preventing the generation of a glitch. Only one of the 10 signals are active at a time and are used in the Mux10to1 block to select the register stage of the LFSR10 counter block to be used as the Clockout. The Clockout is used to clock the circuit being protected from power analysis attacks. The Clockout signal is gated by Presetn such that clocks are not generated while the circuit is being initialized. The LFSR10 block will roll-over to its initial value in $2^n-1$ counts. A decode within the LFSR10 block creates a signal called init_minus1 which occurs one clock prior to the LFSR10 block rolling over to its initial value. This init_minus1 signal is used to enable clock the LFSR4 counter by 1 count and the changing S4(3:0) which is decoded by the Dec16 and a new value of Dec16_q(9:0) becomes active. A different output of the LFSR10 counter is then selected to become Clockout at the rollover point of the LFSR10 counter.

In short, the LFSR4 counter selects different outputs of the LFSR10 counter and concatenates this selected clock stream to the prior clock stream at the rollover point. The nature of the LFSR counters individual outputs show that the generated Clockout signal is not a continuous stream of one and zero pulses but an irregular pattern of one and zero pulses. However, the frequency of ones and zeros is essentially evenly split over a period to time. This split makes predicted output processing using this clocking scheme to be predictable based on the number of clocks needed to completely process the information being protected.

The ability of preloading the LFSR4 and LFSR10 counters with values stored from last shutdown or reset enhances the overall variability of the clocking from session to session. The variability of the clock time and the variability from session to session will significantly increase the difficulty of gathering and processing power signatures when attacking a circuit using DPA or SPA.

Referring again to FIG. 6, is an example demonstrating the decodes used to detect the all 0's state which generates the Error signal as well as show how the init_minus1 signal is generated. The Presetn signal initializes this LFSR4 counter such that it does not use the all 0's value, which is a lockup state. The S4[3:0] is the output of this LFSR counter and is used by other logic. The Error is detecting an all 0's state (i.e., the lockup state) that is an error event if that should occur during runtime. This signal will be synced to the clock in the external controller to avoid an error glitch propagating through the system. The init_minus1 signal is used in some embodiments to inform the system that the LFSR4 will wrap around on the next clock.

Figure 7:
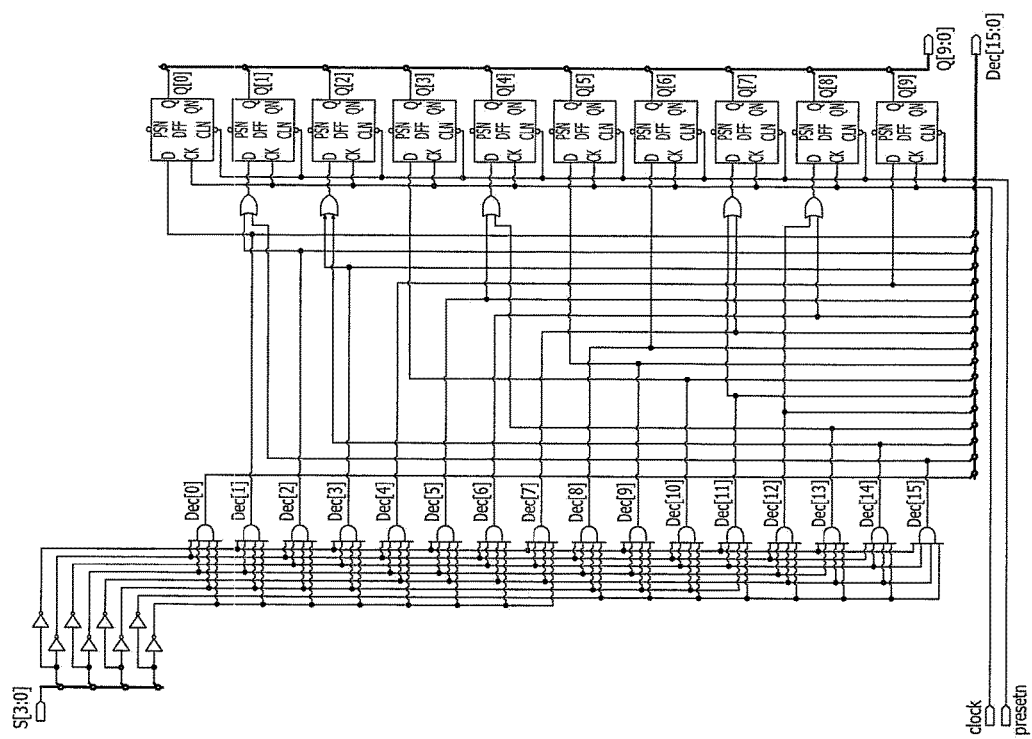
FIG. 7 is a schematic of an exemplary decoder.

Referring to FIG. 7, the Dec16 block takes the four inputs from the LFSR4 and decodes them into 1 of 16 unique decodes Dec[15:0]. Notably use of the LFSR decode Dec[0] is an illegal decode (i.e., the lockup condition). These decodes are used directly or combined into the 10 output registers. Only 1 of the 10 output register outputs will be a '1' value at any given time. As there are only 10 bits of the main LFSR10 available but 15 valid decodes, some of the decodes are "OR'd" so their values will be utilized. The effect being to further extend the effective pattern of the Clockout. Dec[0] is not used, but is shown for clarity.

The Q[9:0] outputs are used to select which bit of the 10 bit LFSR (LFSR10) is used for the Clockout. The Dec[15:0] output is for simulation debug purposes and is generally not used in the final design. Clock and presetn are used to deglitch the output Q[9:0] as well as initialize the Q[9:0] output.

Figure 8:
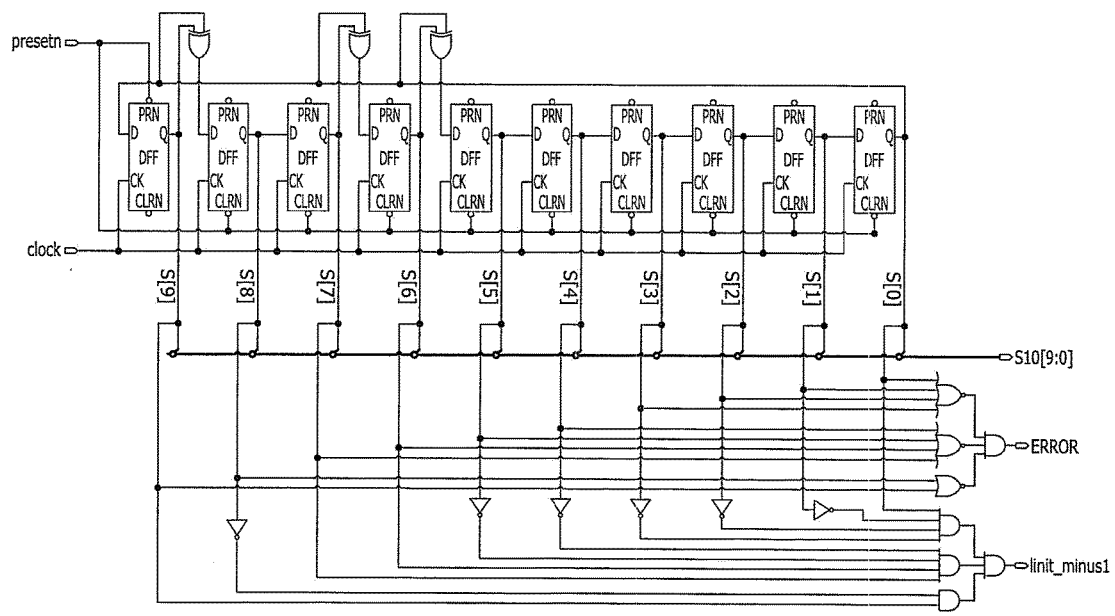
FIG. 8 is a schematic of an exemplary linear feedback shift register counter.
Figure 9:
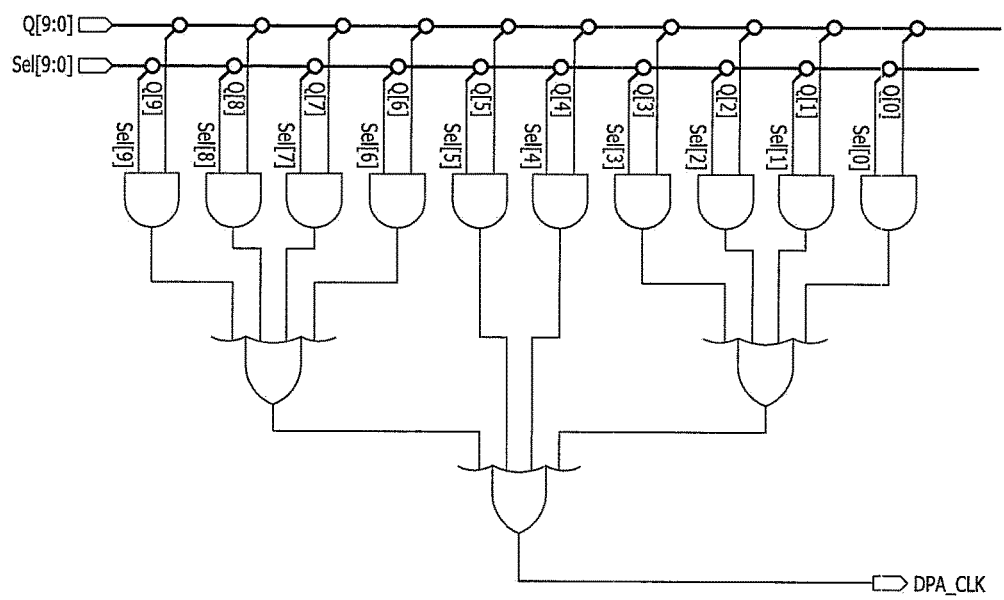
FIG. 9 is a schematic of an exemplary multiplexer selector.

Referring to FIG. 8, LFSR10 is again a 10-bit LFSR. The inputs clock and presetn initialize the circuit. The various outputs of the LFSR are outputs S10[9:0], which are sent to the Mux10to1 block. The ERROR checks the outputs for the all 0's lockup condition and sends this information to the external controller. The init_minus1 decodes the state of the LFSR 1 clock time before the counter will roll over to restart the counter again. This init_minus1 signal is used to tell the LFSR4 when to advance it's count and change the S4[3:0] value thereby selecting through the Dec16 the next output from the LFSR10 (S10[9:0]) via the Mux10to1. In FIG. 9, the Mux10to1 selects which Q[9:0] output from the LFSR10 counter is used as the clockout (DPA_CLK). This diagram is a logical simplification used to describe the logical functionality, the actual implementation will be specific to the technology, libraries, and timing required by the final design.

Figure 10A:
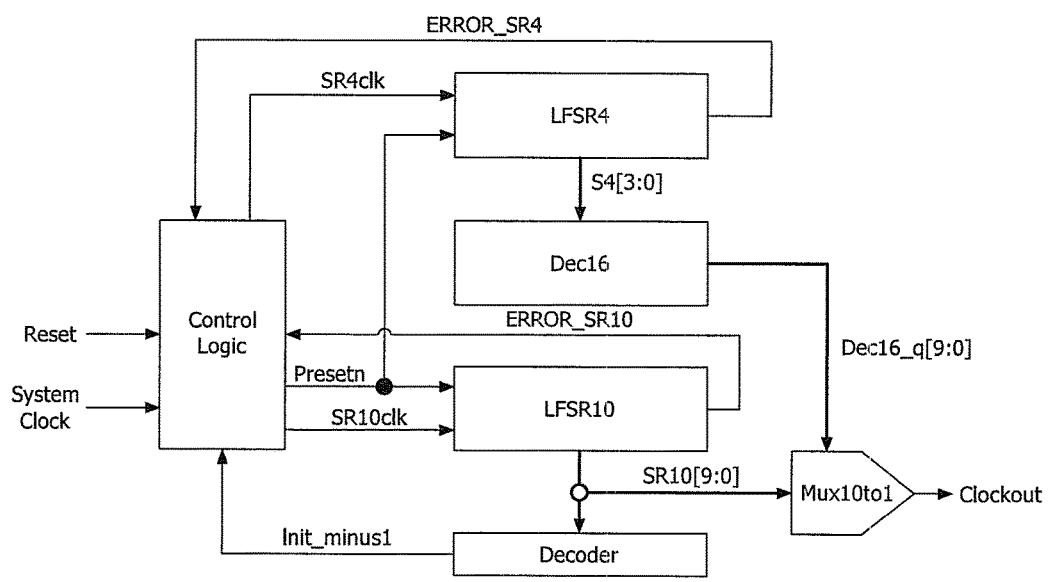
FIG. 10(a) is a block diagram of a power analysis resistant clock according to at least another embodiment of the present disclosure.
Figure 10B:
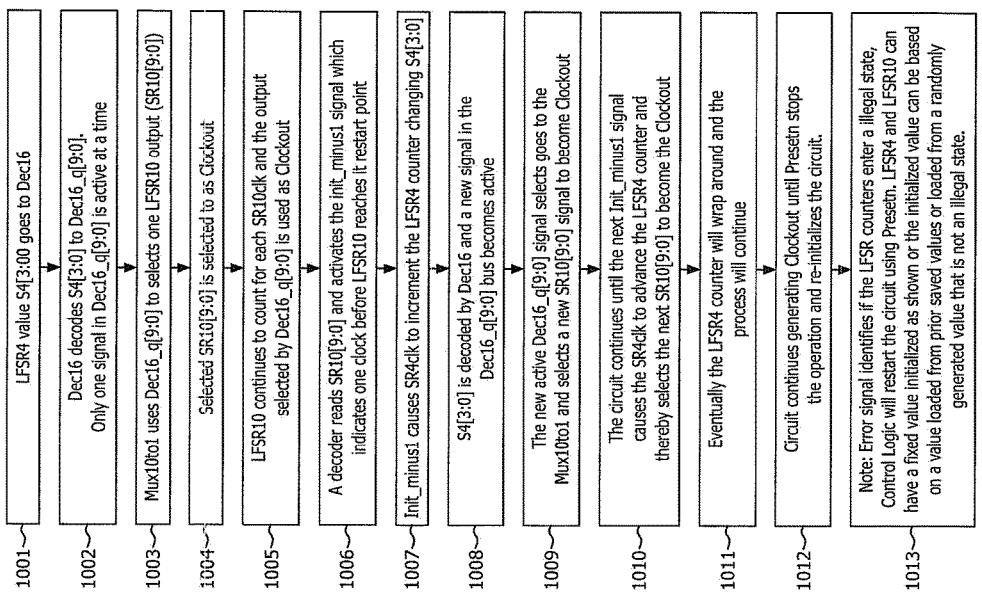
FIG. 10(b) illustrates generally a power analysis resistant clock method.

FIG. 10(a) is a block diagram of a power analysis resistant clock according to at least another embodiment of the present disclosure. FIG. 10(b) illustrates a state diagram according to an embodiment of the present disclosure.

Specifically, LFSR4 value S4[3:0] goes to Dec16, 1001, which decodes S4[3:0] to Dec16_q[9:0] (wherein only one signal in Dec16_q[9:0] is active at a time), 1002. Mux10to1 uses Dec16_q[9:0] to select one LFSR10 output (SR10[9:0]), 1003. The selected SR10[9:0] is thus selected as Clockout, 1004. LFSR10 continues to count for each SR10clk and the output selected by Dec16_q[9:0] is used as Clockout, 1005. A decoder reads SR10[9:0] and activates the init_minus1 signal, which indicates one clock before LFSR10 reaches its restart point, 1006. Init_minus1 causes SR4clk to increment the LFSR4 counter changing S4[3:0], 1007. S4[3:0] is decoded by Dec16 and a new signal in the Dec16_q[9:0] bus becomes active, 1008. The new active Dec16_q[9:0] signal selects a new SR10[9:0] signal to become Clockout, 1009. The circuit continues until the next Init_minus1 signal causes the SR4clk to advance the LFSR4 counter and thereby selects the next SR10[9:0] to become Clockout, 1010. Eventually the LFSR4 counter will wrap around and the process will continue, 1011. The circuit continues generating Clockout until Presetn stops the operation and re-initializes the circuit, 1012.

In certain embodiments, an error signal indicates if the LFSR counter enters an illegal state. Control Logic will restart the circuit using Presetn, for example. LFSR4 and LFSR10 may have a fixed value initialized, or the initialized value is based on a value loaded from a prior saved value, or loaded from a randomly generated value that is not an illegal state, 1013.

FIG. 11(a) illustrates a simulation with a clock line and irregular clocking in accordance with the present disclosure. The SR4 clock is low throughout the simulation as the LFSR10 has not reached its rollover point in this simulation. The simulation shows the output Clockout being irregularly spaced. FIG. 11(b) shows the SR4 clock occurring about midway through the simulation plot caused the S4[3:0] output and the Dec16_q[9:0] outputs to change. The Clockout shows the irregular output clocking.

Further enhancements to the circuit can be made by modifying the length of the LFSR counter or changing the selection of feedback terms within a counter over time. Such enhancements further complicate a predictive sampling attack on the circuit.

Additional flip-flops may be added to the counter whereby the length of the counter is extended and thus extends the number of counts before the counter repeats or cycles around to a starting point. For example, if the counter is 10 bits long, the number of counts available before that counter restarts is $2^{10}-1=1023$ counts and, when each output is selected in turn, the 1023 counts*number of bits of the counter is 10,230 counts. Or if the counter is 16 bits long, the length of the count before the counter repeats is 65,535 counts and the total clock stream becomes 1,048,576 counts, which is the maximal length of the count before repeating. It should be apparent that the length of the algorithm that is being run (i.e., how many counts is required to execute the complete algorithm that is being protected) implicates how difficult or time consuming the work of an attacker will be to extract protected data. As a result, there becomes a tradeoff in area used in the circuit, power used to generate the clocks, and the algorithm computing counts needed.

At least some embodiments of the present disclosure use standard logic available in various forms of chip design. Embodiments are not technology-specific and can be implemented in nearly all forms of programmable logic. Embodiments of the disclosure are scalable to increase or decrease the length of the count before repetition. The disclosure is extendable to further complicate the clock pattern generation.

At least one embodiment of the present disclosure is made to be non-repetitive at startup, meaning it does not restart to the same point at each power up. This requires logic outside of this block to store information that is retrieved and loaded at power up. Embodiments of the present disclosure guarantee a specific number of clocks during a given period to allow for predicted output times. The disclosure delivers an irregular series of clocks over time which makes SPA and DPA power attacks much more difficult. Embodiments of the present disclosure is relatively small (few gates) and power efficient (shift register counters).

One or more benefits of the present disclosure include: use of all digital design elements commonly available in both digital ASIC and FPGA design libraries; elimination of custom circuits or analog circuitry; use of standard ASIC and FPGA design verification tools to verify timing, for example; use of LSFR architecture that is small in area, low in complexity and well documented in literature; use of standard elements that are able to utilize standard ASIC test development methodologies for manufacturing test; and extension to larger implementations (i.e., larger LFSR). Moreover, instead of using a fixed starting point, it is possible to store the last state information prior to shut down, and the starting point or randomly selected starting point for subsequent power cycles is made to not always start at the same point in the counter, which further complicates the ability of attackers to predict when a clock will occur.

The above description is intended to be illustrative and not restrictive. While illustrative embodiments have been set forth above and in the accompanying figures, those skilled in the art who have reviewed the present disclosure will readily appreciate that other embodiments can be realized within the scope of the claims herein and their equivalents. It is to be understood that the disclosure is capable of use in various combinations, modification, environments, and applications. For example, the above-described examples (or one or more aspects thereof) may be used in combination with each other.

Unless defined otherwise, all technical and scientific terms used have the same meaning as commonly understood by one of ordinary skill in the art to which they pertain. Additionally, the articles "a" and "an" are used herein to refer to one or to more than one (i.e., to at least one) of the grammatical object of the article. By way of example, "an element" means one element or more than one element.

Adaptations of known systems and methods that are apparent to those skill in the art based on the description of the disclosure contained herein are within the scope of the claims. Moreover, later-developed equipment that carries out the methods or combination of elements set forth in the claims are within the scope of the disclosure. Accordingly, the descriptions are not intended to limit the form or application disclosed herein.

What is claimed is:

1. An apparatus resistant to power analysis comprising:
a control logic circuit configured to distribute a system clock signal in the apparatus;
a linear feedback shift register configured to output a pseudo-random bit stream;
a first decoder configured to receive the pseudo-random bit stream and to output a selector signal;
a counter configured to output a linear feedback shift register clock pattern;
a second decoder configured to receive the linear feedback shift register clock pattern, detect when the linear feedback shift register will repeat, and to output a signal to the control logic circuit; and
a multiplexer configured to receive the selector signal and the linear feedback shift register clock pattern and to output a pseudo-random clock signal, wherein the pseudo-random clock signal is used to clock a circuit that processes data.

2. The apparatus of claim 1, wherein the data is encrypted.

3. The apparatus of claim 1, wherein the counter comprises a plurality of flip-flops configured to achieve a maximal length.

4. The apparatus of claim 1, wherein the control logic circuit is further configured to receive a reset signal and an error signal.

5. The apparatus of claim 4, wherein the error signal is used to safeguard the counter against the use of a lockup state.

6. The apparatus of claim 4, wherein the control logic circuit is further configured to ensure that a starting sequence is varied following a reset or power-on event.

7. A method for generating a power analysis-resistant clock signal, the method comprising the steps of:
outputting, by a first linear feedback shift register, a first value;
receiving the first value, by a first decoder, and outputting a first active signal;
outputting, by a second linear feedback shift register, a second value;
receiving, by a multiplexer, the first active signal and the second value, and outputting a clockout, wherein the multiplexer uses the first active signal to select the clockout from the second value;
distributing, by a control logic circuit, a system clock signal to the first linear feedback shift register and the second linear feedback shift register;
further wherein the second value is also received by a second decoder that outputs a second signal that is received by the control logic circuit to increment the first linear feedback shift register until the first linear feedback shift register wraps around.

8. The method of claim 7, wherein an error signal identifies if the first linear feedback shift register or the second linear feedback shift register enters an illegal state.

9. The method of claim 8, further comprising the step of stopping, re-initializing, or restarting, by the control logic circuit, using a preset signal.

10. The method of claim 9, wherein the first linear feedback shift register or the second linear feedback shift register have a fixed value initialized.

11. The method of claim 9, wherein the first linear feedback shift register or the second linear feedback shift register have a value initialized based on a value loaded from a prior saved value.

12. The method of claim 9, wherein the first linear feedback shift register or the second linear feedback shift register have a value initialized from a randomly generated value that is not an illegal state.

* * * * *